United States Patent [19]

Coutiere

[11] Patent Number: 5,026,549

[45] Date of Patent: Jun. 25, 1991

[54] METHOD OF EXTRACTING SOLID MATERIALS USING A SOLVENT AND AN APPARATUS FOR IMPLEMENTING SAME

[75] Inventor: Dominique Coutiere, Labrit, France

[73] Assignee: Biolandes Technologies, Labrit, France

[21] Appl. No.: 301,410

[22] Filed: Jan. 25, 1989

[30] Foreign Application Priority Data

Aug. 26, 1988 [FR] France .................................. 88 11246

[51] Int. Cl.$^5$ .............................................. A61K 35/78
[52] U.S. Cl. .................................................. 424/195.1
[58] Field of Search ..................................... 424/195.1

[56] References Cited

U.S. PATENT DOCUMENTS

| | | | |
|---|---|---|---|
| 4,444,763 | 4/1984 | Davis | 424/195.1 |
| 4,554,163 | 11/1985 | Weber | 424/195.1 |
| 4,554,170 | 11/1985 | Panzner et al. | 426/651 |
| 4,592,911 | 6/1986 | Behr et al. | 424/195.1 |
| 4,601,906 | 7/1986 | Shindler | 424/195.1 |

*Primary Examiner*—John W. Rollins
*Attorney, Agent, or Firm*—Fleit, Jacobson, Cohn, Price, Holman & Stern

[57] ABSTRACT

The invention provides a process for the extraction of solid materials using a solvent and the apparatus for implementing same. In this process, the solvent/solute separation is provided by vaporization without special precautions in the apparatus, the vapor phase thus obtained being subjected to centrifugal separation in the separator.

13 Claims, 3 Drawing Sheets

METHOD OF EXTRACTING SOLID MATERIALS USING A SOLVENT AND AN APPARATUS FOR IMPLEMENTING SAME

BACKGROUND OF THE INVENTION

The invention relates to a process for extracting solid materials using an organic solvent and relates more particularly to units having to operate continuously under the following working conditions:

large variety of plant materials to be extracted,
numerous different solvents,
very numerous successive runs using different solvent/solute associations, each run being of short duration,
reduced qualification of the operating personnel.

The invention also relates to the apparatus for implementing the process.

The technique usually used for separating the solvent is that of fractionation which comprises a distillation column with trays or packing, a column head vapor condenser and possibly a column bottom reboiler. Depending on the characteristics of the solvent/solute pair and on each of the components of the pair, there is modification of the fundamental characteristics of the fractionation column such as:

feeding height of the fresh feed,
type of packing,
number of trays.

The treatment of very numerous solvent/solute pairs forces manufacturers to invest in very sophisticated (fractionation) equipment with multiple possibilities of adjustment, dismantling and modification so as to be able to cope with the extended range of its operating conditions.

The manufacturer must in addition have a highly qualified staff capable of carrying out the adjustments, dismantling operations and modifications which take place between runs.

Finally, so as to limit the impact of the cost and the length of these adjustment, dismantling and modification phases on the exploitation, the industrialist will attempt to extend the duration of the runs with the same solvent/solute pair while taking risks that the basic products or the intermediate products stored waiting for treatment are degraded.

The Applicant has sought to avoid these drawbacks by:

a process simple to put into practice making it possible to use readily constructed equipment,
flexibility of use based on the modification of the reference values of the control variables of the process rather than on the configuration of the installation for implementing the process,
easy automation of the operation because of the continuous operation and the reproducibility of the control variables.

SUMMARY OF THE INVENTION

The present invention relates then to a process for extracting solid materials using a solvent, more particularly the production of essential oils from plants, characterized in that it comprises the following steps:

(a) the solvent/solute mixture is subjected to vaporization, (b) the vapor phase containing a residual amount of less volatile liquid in the form of droplets is subjected to centrifugal separation in a separator with controlled wall temperature so as to obtain a purified vapor phase and a liquid phase. The invention also relates to the apparatus corresponding to implementation of this process.

The principle of the present invention is based on the evaporation of the solvent/solute pair without particular precautions giving rise to a solvent rich gas phase in which fine solute droplets are to be found and a solute rich liquid phase still containing a certain amount of solvent. The gas phase is then subjected to centrifugal effect for recovering the fine solute droplets and the organic solvent thus purified is subsequently condensed. The recovered droplets are collected if required by a washing effect.

BRIEF DESCRIPTION OF THE DRAWINGS

The invention will be better understood from reading the following description of one embodiment with reference to the accompanying drawings in which.

DESCRIPTION OF THE PREFERRED EMBODIMENT

Figure 1:
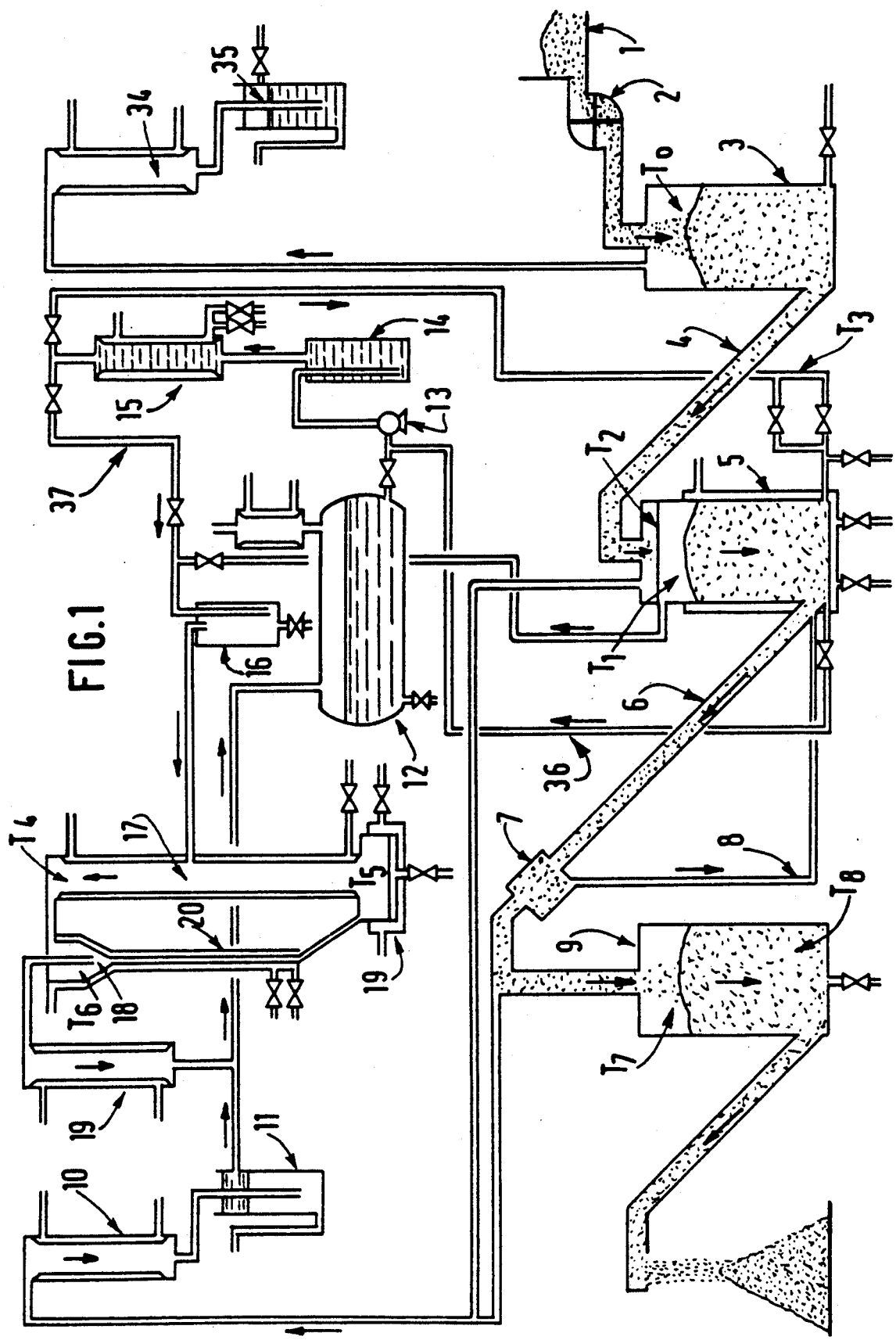
FIG. 1 shows the general diagram of the process.

Referring to FIG. 1, the fresh plant material appropriately crushed is drawn from a storage hopper 1 by a conveying device 2 for continuously and adjustably feeding a vapor pre-treatment tank 3. This steam pre-treatment may be hydrolysis, i.e. maintenance of the mass of plant material contained in the tank 3 at a temperature less than 100° C. by injecting the appropriate amount of vapor, or hydro-distillation, namely the steam entrainment of the volatile fractions released by the mass of plant material contained in tank 3. It is this last case which is illustrated in FIG. 1 where the tank 3 has been shown with its circuit for collecting the head vapors which are condensed in the condenser 34, the resultant liquid being separated in the separator 35 into an aqueous phase and an essential oil. The pre-treated plant material is extracted continuously and adjustably from tank 3 by a conveying device 4 for feeding a solvent extraction tank 5 into which it is fed through the upper part. Fresh solvent taken from tank 12 and pressurized by means of a pump 13 is filtered by filter 14 and brought to the appropriate temperature by the exchanger 15 before being injected in the bottom of the jacketed extraction tank 5. Exchanger 15 may be further fed either with vapor or with cold water and may therefore operate either as a heater or a cooler of the solvent. The plant material transits in the extraction tank 5 from top to bottom, counter-current wise with respect to the extraction solvent which flows from bottom to top. The exhausted plant material is drawn off continuously and adjustably from the extraction tank 5 by means of a conveying device 6 feeding a mechanical press 7. With this mechanical press 7, a solvent fraction is recovered which contains solute, which increases the yield of the extraction operation. This fraction is conveyed to the extraction tank 5 by pipe 8. After passing through the mechanical press 7, the exhausted plant material enters a blowing tank 9 where vapor stripping is carried out for vaporizing the residual solvent. The gaseous water vapor/solvent mixture is fed to a condenser 10 for recovering a liquid water/solvent mixture which undergoes gravitational separation in the decanter 11, the solvent fraction being recycled to the solvent tank 12, the aqueous fraction being rejected. After blowing, the exhausted plant material extracted from tank 9 is stored and forms a residue which may be given a certain value, particularly by combustion. After penetrating into tank 5 and flowing counter-current wise with respect to the plant material, the fresh solvent is withdrawn from the upper part of tank 5 by overflowing after it has fulfilled its extraction function and is thus charged with essential oils in solution. Tank 5 is disposed in elevation so that the solvent is withdrawn at a sufficient static height for the pressure thus available to allow the solvent to pass through filter 16 before being injected into the vertical steam heated exchanger 17 for undergoing partial vaporization therein. The vapor phase thus obtained, which contains a high proportion of solvent entraining a suspension of fine solute droplets, is fed to the cyclone 18 where the droplets are flung against the external wall by centrifugation, the purified solvent leaving the cyclone 18 through its head pipe for feeding to the condenser 19 where it is recovered in the liquid state, to be then fed to the storage tank 12 for recycling.

The solute droplets flung against the wall of cyclone 18 stream over this wall despite the viscosity of the solute through the cold wall effect obtained by the jacket with which the cyclone 18 is provided, which jacket is water cooled. This cold wall effect causes the condensation of a very small amount of solvent which is in fact enough to entrain the solute recovered by centrifugation. This solvent/solute fraction very rich in solute is collected at the base of cyclone 18 to be fed to vessel 19 through pipe 20 which is provided with a double wall for controlling the flow. Vessel 19 mainly collects the fraction, which is not vaporized in exchanger 17, of the solvent/solute mixture injected into this same exchanger 17. This non vaporized fraction is therefore very rich in solute. This vessel 19 is fitted with a steam fed heating device, coil or jacket, for adjusting the residual solvent content of the final product, by complementary evaporation of a fraction of this solvent. In order to produce certain essential oil or concentrates which are very fragile, vessel 19 may be heated in a water bath by a liquid bathing the external wall of vessel 19, said liquid being kept at the required temperature, for example by immersing therein a coil fed with steam. The essential oil or concentrate is extracted semi-continuously through the bottom pipe of vessel 19. Since the flow speed of this solid is often very low, it may advantageously be drawn off by suction using a vacuum connection fitted on the pipe at the bottom of vessel 19.

At the end of an operation for treating a specific plant material, tank 5 is emptied through pipe 36 into tank 12. The solvent is purified of any residual solute by being, pumped by pump 13, through filter 14 and exchanger 15 then directly to exchanger 17 through pipe 37, there to be vaporized. The purified solvent is collected at the outlet of exchanger 19 before returning to the tank 12.

Figure 2:
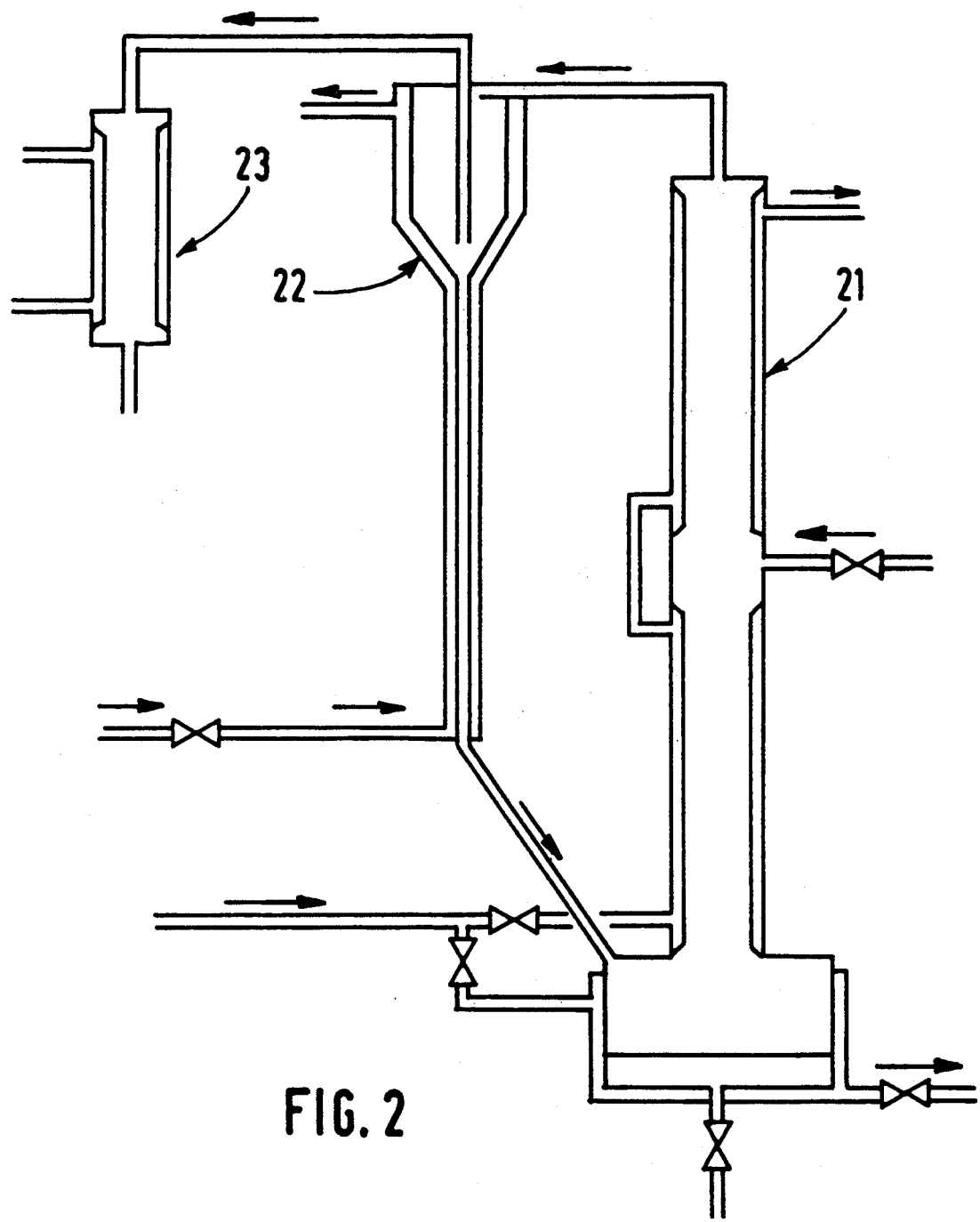
FIG. 2 shows one construction of the centrifugal separation apparatus.

A preferred embodiment of the apparatus for implementing the process of the invention is given by the following description with reference to FIG. 2.

The tubular exchanger 21 receiving the fresh feed is arranged vertically and has intermediate tubular plates so that the supply of fresh feed may be installed approximately at mid-height. The lower part of the exchanger forms an accumulation chamber for collecting the concentrate. This lower part is provided with an internal coil. The upper part is provided with a vapor pipe which connects exchanger 21 to cyclone 22. Cyclone 22 receives the vapors from exchanger 21. It is constructed so that the temperature of the whole of its circumferential wall may be controlled by admitting water into a jacket. A pipe connects the bottom of cyclone 22 to the bottom of exchanger 21. Another pipe connects the upper part of cyclone 22 to a condenser 23 of standard construction.

Figure 3:
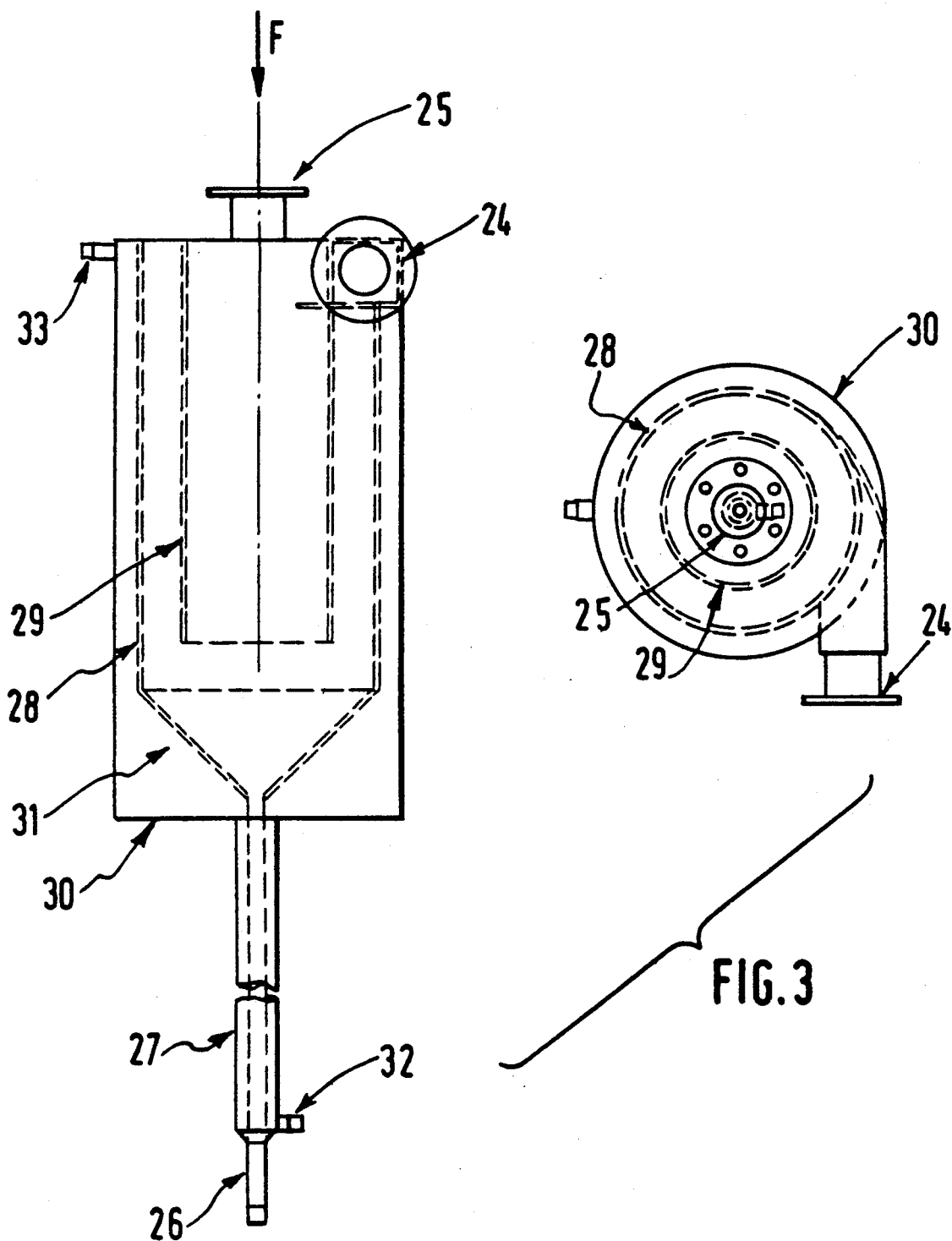
FIG. 3 shows the detail of the construction of the cyclone.

The detail of the construction of the cyclone is shown in FIG. 3 where the following have been shown respectively:

the pipe 24 through which the solvent vapor/solute droplet mixture arrives, the outlet pipe 25 for the purified solvent, the pipe 26 for recovering the solvent/solute mixture and its jacket 27, the peripheral wall 28 of the cyclone and its vapor discharge chimney 29, the jacket 30 of the cyclone forming a free volume in contact with the peripheral wall 28 of the cyclone for temperature control of said wall, pipes 32 and 33 for feeding and removing the heat carrying fluid used for temperature control of the wall of the cyclone.

The operation of the facility such as described in connection with FIG. 1 may be itemized as follows:

The flow of plant material to be treated by the installation is controlled as a whole by the feed rate of the conveying device 2.

The characteristics and expected results of the steam pre-treatment of the plant material are controlled by the amount of steam admitted into tank 3 and the temperature thereof provided by the probe T0.

If it is a question of steam hydrolysis pre-treatment, the temperature to taken in the atmosphere over the plant material in tank 3 will be typically kept close to 80° C. by controling the valve injecting steam into tank 3.

If it is a question of hydro-distillation pre-treatment, the temperature T0 is without action, and the flow of steam injected into tank 3 is fixed as a function of the treated plant material and of the treatment flowrate.

The characteristics and results obtained by solvent extraction carried out in tank 5 are dependent on:

the temperature of the solvent during extraction provided by probe T1, which is controlled by the amount of heat brought to or taken from tank 5 through its jacket, the temperature of the fresh solvent, given by probe T3, which is controlled by means of the operation of exchanger 15, The recovery of the residual solvent in the exhausted plant material is controlled by the temperatures given by probes T8 and T7. T8 is placed at the bottom of tank 9 in the plant material and detects the solvent exhaustion thereof. The temperature indicated is very little less than 100° C. T7 is placed in the vapor atmosphere of the tank 9 and takes into account the solvent/water vapor proportion in this gas mixture, The speed of the gas phase penetrating into cyclone 18 is controlled by regulating the liquid flow from pump 13, which flow is that of the solvent/solute mixture admitted into exchanger 17, in association with the regulation of the amount vaporized in exchanger 17 which depends on the heat brought to this exchanger 17 so on the amount of steam delivered to this exchanger 17. A variable representative of the operation of exchanger 17 is the temperature of the vapor leaving at the head of this exchanger 17 delivered by probe T4. If the solvent flowrate varies, the temperature T4 also varies and consequently corrects the steam flow feeding exchanger 17.

The temperature of the peripheral wall of cyclone 17 is controlled through the amount of cooling water fed into the jacket thereof in accordance with the indications from the temperature probe T6. This wall temperature is typically slightly less than that for vaporization of the solvent.

The temperature of the final product contained in vessel 19 is controlled by regulating the amount of vapor admitted into the coil with which it is provided and through the indications of the temperature probe T5. It varies as a function of the solvent and of the fragility of the product collected.

Temperature T2 given by the probe situated in the gas atmosphere of tank 5 is a safety means which stops the installation in the case where the vaporization temperature of the solvent used is reached.

The solute concentration in the solvent drawn off from tank 5 is typically between 0.2 and 2%.

The residual solvent concentration of the final product drawn off from vessel 19 is typically from 35 to 60%.

It can then be seen that it is possible to control all the operating variables of the process through:
- the temperature probes T0 to T8, each acting on the control device(s) regulating the heating or cooling flow corresponding thereto,
- the flowrate of the solvent feeding tank 5,
- the flowrate of fresh plant material feeding the pretreatment tank 3.

All of these control/regulation loops may be automated for controlling the reference values of each variable. These reference values correspond to operating conditions which are specific for each plant material treated by a given solvent, but which may be kept in memory by the automatic system. That makes then a very quick start-up possible after each change of plant material to be treated, the period of adjustment of the operating conditions of the process to the new plant material being taken over by the automatic regulation device. With the control of the process provided by an automatic device, this latter may also fulfil certain additional supervisory functions such as:
- level of the tanks and hoppers,
- final drawing off of the product, alarms and safety of the installation.

What is claimed is:

1. A process for extracting solid materials using a solvent, comprising the following steps:
   (a) mixing said solid material with a solvent to form a solvent solute mixture, wherein at least one component of said solid material is soluble in said solvent;
   (b) vaporizing said mixture to form a vapor that contains at least a portion of the less volatile liquid components of said mixture in the form of liquid droplets;
   (c) separating the vapor from the droplets in a centrifugal separator at a controlled wall temperature, whereby the droplets coalesce on the wall and wherein the temperature of the wall of the separator is selected such that a sufficient amount of the vapor continuously condenses on the wall in order to permit recovery of the coalesced droplets.

2. The process of claim 1, wherein said mixture is partially vaporized, whereby a solvent vapor phase charged with solute droplets and a solute-rich liquid phase forms.

3. The process of claim 2, wherein the liquid phase that is separated by centrifugal separation is combined with said solute-rich liquid phase.

4. The process of claim 1, wherein said extraction is effected by batch extraction in which fresh solid materials are mixed with fresh solvent.

5. The process of claim 1, wherein said extraction is continuous and the solvent/solute mixture is produced by continuously mixing fresh solid materials with fresh solvent, introducing fresh solid material and removing spent material.

6. The process of claim 4 or 5, further comprising pressing the spent material, collecting the liquid obtained from said pressing step, and adding it to said solvent-solute mixture before step (b).

7. The process of claim 6, wherein the solid spent materials are subjected to steam blowing.

8. The process of claim 4 or 5, wherein the fresh solid materials are subjected to steam treatment prior to solvent extraction.

9. The process of claim 8, wherein said steam treatment is hydro-distillation.

10. The process of claim 1, wherein said solid material is plant material from which essential oils are extracted.

11. The process of claim 1, wherein control of said process is is effected by constantly monitoring the temperature and flow rate of the components of said process, including said solid material, solvent solute mixture, said vapor and liquid phases and said centrifugal separator and automatically adjusting said temperatures and flow rates.

12. The process of claim 11, wherein said solid material is a plant and reference values for each plant material/solvent pair are electronically stored.

13. A process for extracting essential oils from plant material, comprising:
   (a) steam treating crushed plant material;
   (b) continuously feeding said steam-treated plant material into an extraction tank through which a solvent flows counter-current wise with respect to said plant material to produce a solvent solute mixture;
   (c) partially vaporizing said mixture to form a vapor, which contains at least a portion of the less volatile liquid components of said mixture in the form of droplets, and a first liquid phase;
   (d) collecting the first liquid phase;
   (e) separating the vapor from said droplets in a centrifugal separator at a controlled wall temperature, whereby the droplets coalesce on the wall and said temperature is controlled during said separation at a temperature that permits continuous condensation of a sufficient amount of said vapor phase to wash said coalesced droplets and to thereby permit collection of the coalesced droplets;
   (f) condensing the separated vapor phase, which is recycled into said extraction tank, and mixing the second liquid phase with said first collected liquid phase; and
   (g) continuously removing spent plant material from the extraction tank, mechanically pressing said spent material, steam blowing it, and then recovering solvent, which is recycled into said extraction tank.

* * * * *